April 13, 1937.  W. S. ROBINSON  2,077,011
PUMP SEALING SYSTEM
Filed June 11, 1935
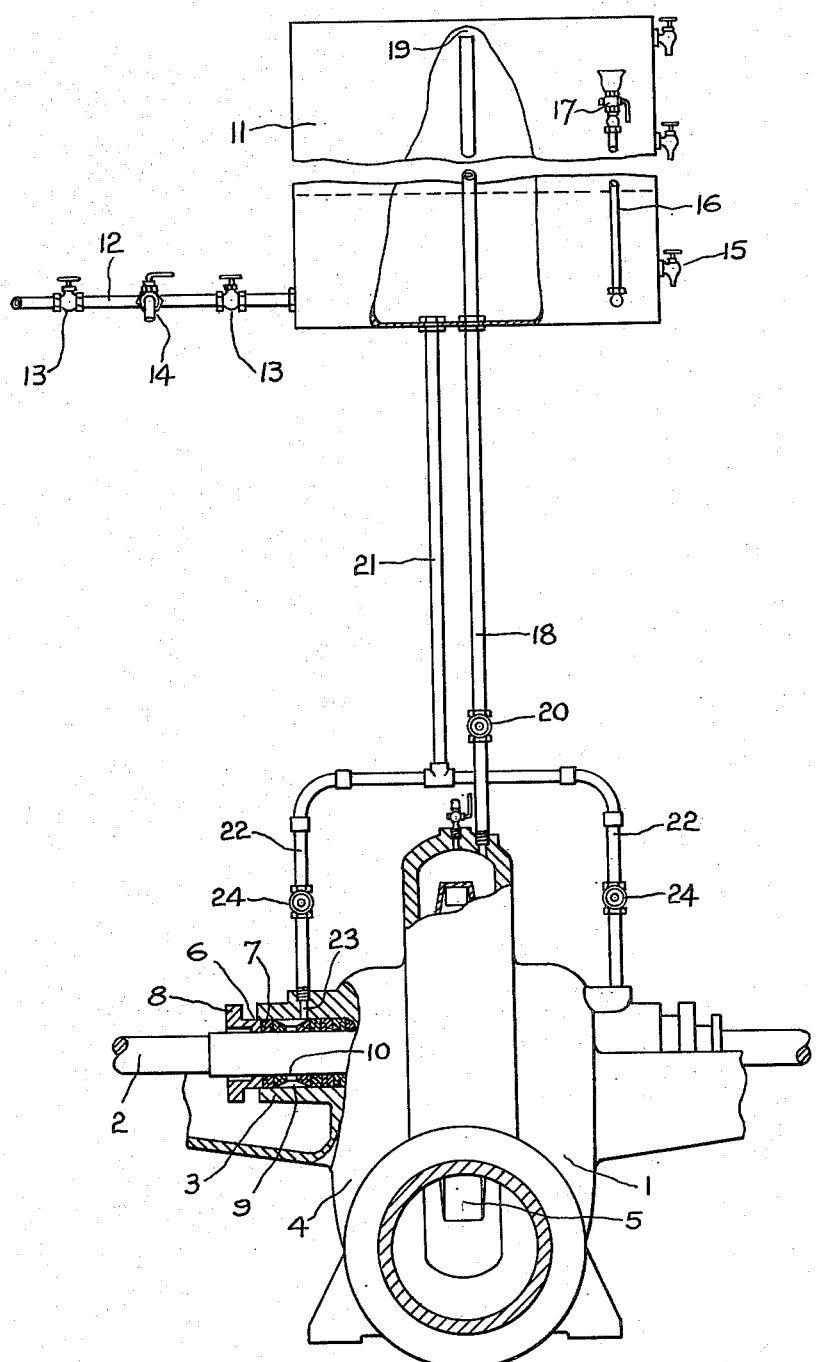
INVENTOR
WALLACE SINCLAIR ROBINSON
BY Fetherstonhaugh & Co
ATTORNEYS Patented Apr. 13, 1937

2,077,011

UNITED STATES PATENT OFFICE 2,077,011

PUMP SEALING SYSTEM

Wallace Sinclair Robinson, Vancouver, British Columbia, Canada

Application June 11, 1935, Serial No. 26,056

1 Claim. (Cl. 103—111)

My invention relates to improvements in gland sealing methods and systems, which are particularly adapted for use on the glands of centrifugal pumps in oil refineries and other places where volatile oils are pumped.

The objects of the present invention are to provide means whereby economy in packing material is effected; whereby the adjusting of packing glands at each operation of the pump is rendered unnecessary, and whereby the liquid pumped is definitely prevented from escaping outwardly through the glands, thus preventing loss of liquid and danger of fire or explosion.

The invention consists essentially of providing the gland of a pump with a port intermediate its length through which water is adapted to be admitted from a tank supported in a position elevated above the pump, as will be more fully described in the following specification and shown in the accompanying drawing, in which:—

The drawing is a general view of the invention part in section.

The numeral 1 indicates a pump having a driven shaft 2 journalled in bearings 3 of the pump casing 4, which is fitted with an impeller 5.

The shaft 2 is surrounded with glands 6 consisting of packing material 7 and gland nuts 8. Intermediate the length of the packing 7 of each gland 6 is a lantern gland 9 having radial openings 10 through its walls.

Mounted at a suitable height above the pump is a sealed tank 11 having a water supply pipe 12 connected to it adjacent its bottom wall. This supply pipe is fitted with two stop valves 13 between which a faucet 14 is placed, the purpose of which will hereinafter appear.

On the side of the tank 11 are pet cocks 15 disposed at desired heights and also a water gauge 16 which is preferably provided at its upper extremity with a priming cock 17.

From an upper portion of the pump casing 4 a pipe 18 is extended upwardly passing through the bottom wall of the tank and extending to a point adjacent its upper extremity as at 19, this pipe is fitted with a valve 20.

A gravity discharge pipe 21 extends downwardly from the base of the tank 11, branching off as at 22 to each of the bearings 3 where they communicate with ports 23 disposed to register with the position of the lantern glands 9. For convenience in replacing packing and other repair work the branches 22 are each provided with valves 24. The pipe 18 is at least as large as, if not larger than, the discharge pipe 21.

The operation of the system in pumping a liquid such as naphtha is as follows:—

Water is admitted to the tank 11 through the valves 13 of the supply pipe 12 until it reaches the level of the uppermost pet cock 15, the valves 24 on the branches 22 of the pipe 21 are opened to allow the water to flow around and through the lantern glands 9 and into the glands 6 where the packing material becomes to some extent impregnated with water keeping it soft and pliable, yet sufficiently tight on a relatively slack adjustment to keep the glands sealed. Where packing suitable for naphtha and gasoline is used, gland nut adjustment is required each time the pump is started and stopped and the force used in compressing the packing material to render the gland reasonably tight causes heat in the bearings and sets up a gaseous and liquid leak which is very dangerous especially when it occurs in the proximity of electric motors.

When the pump is set in motion the pressure of water at the lantern glands 9 will be equal to that developed in the pump casing plus the head of water in the tank and its pipe connections above the glands, and also plus the difference in specific gravity between the water and any naphtha in the pipe 18, so that any leakage past the glands will be satisfied with water flowing from the ports 23 to the pump casing and from the ports 23 outwardly through the gland nuts 8; the naphtha being under lesser pressure than the water will be unable to flow outwards from the pump casing, hence, no loss of naphtha will occur and no fire or explosion hazard will develop. As water leaks past the glands 6 from the tank so naphtha is forced up into the tank through the pipe 18 to keep said tank full. The difference in specific gravity of the two liquids will leave the naphtha on the top of the water and if a few spots of liquid of a specific gravity in between that of water and naphtha are introduced into the gauge glass 16 the water level in the tank can be readily determined at all times.

A surplus of naphtha can be ejected from the tank 11 by admitting water thereto under suitable pressure from the pipe 12, or, if the pump is stopped, by first draining off the water and then the naphtha through the faucet 14 or alternately from the pet cocks 15.

Water may be supplied to the tank through pipe 12 to compensate for the loss of water leaking past the glands 6. The method of regulating the flow of water to the tank is as follows:—after determining the amount of water leaking past the glands within a certain period of time, the valves 13 are closed and the faucet 14 is opened. Then the valve 13 farthest away from the tank is opened sufficiently to allow the water to drip from the faucet 14 at the same rate as the water drips from the glands. When the water is flowing at the desired rate, the faucet 14 is closed and the valve 13 adjacent the tank is opened, allowing the water to flow into the tank. In this way the apparatus will function for hours without any attention and there is no danger of the water pressure becoming reduced or of naphtha getting into the glands and leaking past them.

In order to ensure the pressure of the water at the glands being equal to that developed in the pump casing plus the head of water in the tank, the pipe 18 is at least as large as the pipe 21. If it were not as large as the pipe 21 a good deal of the pressure developed in the pump casing would be lost due to the fact that the water would be flowing away from the tank faster than the liquid would be supplied thereto through pipe 18.

If desired a relief valve could be used in the top of the tank 11 to admit air thereto, in which case the pipe 18 could be dispensed with.

What I claim as my invention is:

Apparatus for sealing the glands of a centrifugal pump against leakage through said glands of the liquid pumped comprising packing loosely packed about the shaft of the pump in the bearings, a sealed tank disposed above the pump, means for continuously supplying a sealing fluid to the tank, a pipe communicating with the casing of the pump and extending into the tank and terminating adjacent the top thereof for delivering some of the liquid pumped directly onto the top of the sealing fluid under the discharge pressure of the pump, a discharge pipe for delivering sealing fluid from the tank to the packing in the glands under pressure greater than that developed in the pump, said sealing fluid being adapted to circulate through and out of the packing, and means through which the flow of the sealing fluid to the tank may be regulated substantially to compensate for the leakage of sealing fluid out of the glands.

WALLACE SINCLAIR ROBINSON.